US010975799B2

(12) United States Patent
Renner et al.

(10) Patent No.: US 10,975,799 B2
(45) Date of Patent: Apr. 13, 2021

(54) INTERNAL COMBUSTION ENGINE HAVING VALVE SEAT POCKETS

(71) Applicant: MAN Truck & Bus AG, Munich (DE)

(72) Inventors: Dominik Renner, Ansbach (DE); Thomas Malischewski, Heilsbronn (DE)

(73) Assignee: MAN TRUCK & BUS AG, Munich (DE)

( * ) Notice: Subject to any disclaimer, the term of this patent is extended or adjusted under 35 U.S.C. 154(b) by 50 days.

(21) Appl. No.: 16/153,038

(22) Filed: Oct. 5, 2018

(65) Prior Publication Data

US 2019/0107077 A1  Apr. 11, 2019

(30) Foreign Application Priority Data

Oct. 5, 2017  (DE) ...................... 10 2017 123 136.6

(51) Int. Cl.
*F02F 3/28* (2006.01)
*F01L 1/34* (2006.01)
(Continued)

(52) U.S. Cl.
CPC ....... *F02F 3/28* (2013.01); *F01L 1/34* (2013.01); *F01L 3/22* (2013.01); *F02B 23/06* (2013.01);
(Continued)

(58) Field of Classification Search
CPC ... F02F 3/28; F02F 1/4214; F01L 3/22; F01L 1/34; F02B 23/06; F02B 29/086; F02D 13/0257; F02D 13/0261
See application file for complete search history.

(56) References Cited

U.S. PATENT DOCUMENTS 5,309,879 A  *  5/1994  Regueiro .............. F02B 19/14
123/286
2003/0200945 A1   10/2003  Saruwatari et al.
(Continued)

FOREIGN PATENT DOCUMENTS

DE         3838305 A1    5/1990
DE    102005031241 A1    1/2007
(Continued)

OTHER PUBLICATIONS

Simultaneous Estimation of Intake and Residual Mass Using In-Cylinder Pressure in an Engine with Negative Valve Overlap, C. Guardiola, 2016, University of Michigan (Year: 2016).*

*Primary Examiner* — Syed O Hasan
(74) *Attorney, Agent, or Firm* — Weber Rosselli & Cannon LLP

(57) ABSTRACT

An internal combustion engine for a vehicle is provided, having at least one cylinder with a first gas exchange inlet valve, a second gas exchange inlet valve, a first gas exchange outlet valve, a second gas exchange outlet valve, and a piston with a piston crown which has a plurality of valve seat pockets. In each case one valve seat pocket is provided for the first gas exchange inlet valve, the second gas exchange inlet valve, the first gas exchange outlet valve and the second gas exchange outlet valve, and the plurality of valve seat pockets have at least partially different depths. Alternatively, one valve seat pocket is provided for the first gas exchange inlet valve and the first gas exchange outlet valve, and no valve seat pocket is provided for the second gas exchange inlet valve and/or for the second gas exchange outlet valve.

14 Claims, 5 Drawing Sheets

(51) Int. Cl.
  *F02D 13/02*    (2006.01)
  *F02B 23/06*    (2006.01)
  *F01L 3/22*     (2006.01)
  *F02B 29/08*    (2006.01)
  *F02F 1/42*     (2006.01)

(52) U.S. Cl.
  CPC ........ *F02B 29/086* (2013.01); *F02D 13/0257* (2013.01); *F02D 13/0261* (2013.01); *F02F 1/4214* (2013.01)

(56) References Cited

U.S. PATENT DOCUMENTS

| | | | |
|---|---|---|---|
| 2008/0276900 A1* | 11/2008 | Umierski | F02B 23/101 |
| | | | 123/193.6 |
| 2012/0125289 A1 | 5/2012 | Mori | |
| 2013/0312697 A1 | 11/2013 | Takahashi | |
| 2015/0107543 A1* | 4/2015 | Bowing | F02F 3/28 |
| | | | 123/193.6 |
| 2015/0107559 A1* | 4/2015 | Bowing | F02B 23/0639 |
| | | | 123/47 R |
| 2017/0058824 A1* | 3/2017 | Weiss | F02F 3/26 |

FOREIGN PATENT DOCUMENTS

| | | |
|---|---|---|
| DE | 102007027787 A1 | 12/2008 |
| DE | 102005002389    | 4/2009 |
| DE | 102007046656 A1 | 4/2009 |
| DE | 102010008958 A1 | 10/2010 |
| DE | 102009037963 A1 | 2/2011 |
| DE | 102012103212 A1 | 10/2013 |
| DE | 102013019183 A1 | 5/2015 |
| DE | 102015004357 A1 | 10/2016 |
| EP | 1835143 A1      | 9/2007 |

* cited by examiner

INTERNAL COMBUSTION ENGINE HAVING VALVE SEAT POCKETS

TECHNICAL FIELD

The invention relates to an internal combustion engine with a piston having a plurality of valve seat pockets.

BACKGROUND

It is known to provide a piston crown of a piston of an internal combustion engine with valve seat pockets for gas exchange valves.

For example, DE 10 2007 027 787 A1 discloses an internal combustion engine, in the case of which valve seat pockets which lie opposite the gas exchange valves are formed in an end face of a piston.

Furthermore, it is known to actuate gas exchange inlet valves and gas exchange outlet valves with a valve overlap. A valve overlap relates to a time period between the beginning of the opening of a gas exchange inlet valve and the end of the closing of a gas exchange outlet valve.

In order for it to be possible, for example, to realize great valve overlaps in the case of diesel engines, valve seat pockets have to be provided in the piston. The valve overlap serves to optimize the gas exchange and therefore to optimize the overall degree of efficiency of the engine. In the case of a positive pressure gradient between the inlet side and the outlet side, air is flushed through the combustion chamber during the valve overlap in the gas exchange in the region of the top dead centre of the piston movement of a piston. The consequences are reduced combustion chamber and exhaust gas temperatures, and an increased degree of efficiency of the turbocharger as a result of the increased air throughput.

The positive effect of the gas exchange is opposed by an impairment of the degree of high pressure efficiency. On account of the required valve seat pockets, for example, the compression ratio is lowered, which has a negative influence on the thermal degree of efficiency. In addition, for example, the combustion pattern and therefore also the combustion efficiency are influenced greatly by way of the valve seat pockets. The valve seat pockets can remove, for example, a large part of the upper recess contour of a combustion-optimized piston recess.

SUMMARY

The invention is based on the object of providing an internal combustion engine with valve seat pockets, by way of which internal combustion engine the positive effect of the gas exchange can be utilized and the degree of high pressure efficiency can be improved.

The object is achieved by way of an internal combustion engine according to the independent claim. Advantageous developments are specified in the dependent claims and the description.

The internal combustion engine is suitable for a motor vehicle. The internal combustion engine has at least one cylinder. The cylinder has a first gas exchange inlet valve and a second gas exchange inlet valve. The cylinder has a first gas exchange outlet valve and a second gas exchange outlet valve. The cylinder has a piston which can be moved to and fro and has a piston crown which has a plurality of valve seat pockets. In each case one valve seat pocket is provided for the first gas exchange inlet valve, the second gas exchange inlet valve, the first gas exchange outlet valve and the second gas exchange outlet valve, and the plurality of valve seat pockets have at least partially different depths (in comparison with one another). As an alternative, in each case one valve seat pocket is provided for the first gas exchange inlet valve and the first gas exchange outlet valve, and no valve seat pocket is provided for the second gas exchange inlet valve and/or for the second gas exchange outlet valve.

A degree of high pressure efficiency of the internal combustion engine can be improved by way of omission or size reduction (flattening) of, for example, one or two valve seat pockets. Inter alia, a combustion-optimized recess contour can be impaired to a less pronounced extent by way of the valve seat pockets which are omitted or are reduced in size. For example, the gas exchange valves which are assigned to the remaining or the non-flattened valve seat pockets can be utilized for a (great) valve overlap. In this way, the advantages of an optimized gas exchange by way of a valve overlap can continue to be achieved.

Furthermore, it has been ascertained that the effect which is brought about by way of the present disclosure with regard to an improved degree of high pressure efficiency with as satisfactory a gas exchange as possible can turn out to be greater in the case of changes of the valve seat pockets of the outlet side than in the case of changes of the valve seat pockets on the inlet side. Accordingly, it is appropriate, in particular, to provide no valve seat pocket or a merely flat valve seat pocket for a gas exchange outlet valve.

For example, a total of two valve seat pockets, three valve seat pockets or four valve seat pockets can be provided. In the case of two valve seat pockets, one valve seat pocket can be provided for the first gas exchange inlet valve and another valve seat pocket can be provided for the first gas exchange outlet valve. In the case of three valve seat pockets, one valve seat pocket can be provided for the first gas exchange inlet valve, a further valve seat pocket can be provided for the first gas exchange outlet valve, and the last valve seat pocket can be provided for the second gas exchange inlet valve or the second gas exchange outlet valve.

In one preferred exemplary embodiment, the first gas exchange outlet valve closes later than the second gas exchange outlet valve, or the first gas exchange outlet valve is capable of closing later than the second gas exchange outlet valve. As an alternative or in addition, the first gas exchange inlet valve opens earlier than the second gas exchange inlet valve or at the same time as the second gas exchange inlet valve, or the first gas exchange inlet valve is capable of opening earlier than the second gas exchange inlet valve or at the same time as the second gas exchange inlet valve. In this way, in particular, a great valve overlap (for example, approximately 40° CA (crank angle)) between the first gas exchange outlet valve and the first gas exchange inlet valve can be made possible. In contrast, a small valve over-lap (for example, approximately 20° CA) or no valve overlap at all can take place between the second gas exchange outlet valve and the second gas exchange inlet valve. It is also possible to make a great valve overlap possible between the first gas exchange outlet valve and the first and second gas exchange inlet valve, whereas the second gas exchange outlet valve has only a small overlap or no valve overlap at all with the first and second gas exchange inlet valve.

In one particularly preferred exemplary embodiment, the first gas exchange outlet valve and the first gas exchange inlet valve are actuated with a valve overlap or can be actuated accordingly. In this way, the gas exchange and therefore the degree of engine efficiency can be optimized.

In a further exemplary embodiment, the first gas exchange outlet valve and the first gas exchange inlet valve are actuated with a valve overlap or can be actuated accordingly, which valve overlap is greater than a valve overlap between the second gas exchange outlet valve and the second gas exchange inlet valve. In this way, deeper valve seat pockets can be provided for the first gas exchange inlet valve and the first gas exchange outlet valve than for the second gas exchange inlet valve and the second gas exchange outlet valve. The deeper valve seat pockets for the first gas exchange inlet valve and the first gas exchange outlet valve make the greater valve overlap and therefore an improved gas exchange possible. The less deep (flattened) valve seat pockets have a smaller influence on the combustion-optimized piston recess and therefore on the combustion.

As an alternative, the first gas exchange outlet valve and the first gas exchange inlet valve can be actuated or can be capable of being actuated with a valve overlap, and the second gas exchange outlet valve and the second gas exchange inlet valve can be actuated or can be capable of being actuated without a valve overlap. In this way, the valve seat pockets can be provided for the first gas exchange inlet valve and the first gas exchange outlet valve. In contrast, no valve seat pockets are provided for the second gas exchange inlet valve and the second gas exchange outlet valve. The valve pockets for the first gas exchange inlet valve and the first gas exchange outlet valve make a valve overlap and therefore an improved gas exchange possible. The omission of the valve seat pockets for the second gas exchange outlet valve and the second gas exchange inlet valve makes it possible to increase the influence of a combustion-optimized piston recess on the combustion.

In one embodiment, a valve overlap between the first gas exchange outlet valve and the first gas exchange inlet valve lies in a range between 30° CA and 50° CA, in particular at approximately 40° CA. As an alternative or in addition, a valve overlap between the second gas exchange outlet valve and the second gas exchange inlet valve lies in a range between 0° CA and 30° CA, in particular at approximately 20° CA.

In one development, a flushing operation of the cylinder during the valve overlap takes place substantially between the first gas exchange inlet valve and the first gas exchange outlet valve which, in particular, lie directly or obliquely opposite one another. In this way, a flushing operation and residual gas reduction which are as satisfactory as possible can be achieved in the case of gas exchange valves which lie obliquely opposite one another, or a mass flow which is as great as possible can be achieved in the case of gas exchange valves which lie directly opposite one another. As an alternative, a flushing operation takes place substantially between the first gas exchange inlet valve, the second gas exchange inlet valve and the first gas exchange outlet valve. In this way, both a satisfactory flushing operation and residual gas reduction and also a mass flow which is as great as possible can be achieved.

In one preferred embodiment, the first gas exchange outlet valve and the second gas exchange outlet valve are actuated independently of one another or can be actuated accordingly. As an alternative or in addition, the first gas exchange inlet valve and the second gas exchange inlet valve are actuated independently of one another or can be actuated accordingly. In this way, gas exchange valves can have different valve control curves which are independent of one another.

In particular, a variable valve train, for example a sliding cam system, can be provided for actuating the first gas exchange outlet valve, the second gas exchange outlet valve, the first gas exchange inlet valve and/or the second gas exchange inlet valve.

For example, the first gas exchange outlet valve, the second gas exchange outlet valve, the first gas exchange inlet valve and/or the second gas exchange inlet valve can be actuated by means of a dedicated rocker arm or drag lever.

In a further embodiment, a valve lift of the first gas exchange outlet valve at the top dead centre (TDC) of the piston movement of the piston is greater than a valve lift of the second gas exchange outlet valve at the top dead centre. As an alternative or in addition, a valve lift of the first gas exchange inlet valve at the top dead centre of the piston movement of the piston is greater than or equal to a valve lift of the second gas exchange inlet valve at the top dead centre. In this way, depending on the requirement, a flat valve seat pocket or even no valve seat pocket at all can be provided, in particular, for the second gas exchange outlet valve. Furthermore, depending on the requirement, a deep valve seat pocket, a flat valve seat pocket or even no valve seat pocket at all can be provided for the second gas exchange inlet valve.

In one particularly preferred design variant, the piston crown has a piston crown recess. In particular, the piston crown recess can be of combustion-optimized configuration.

In a further design variant, a maximum depth of a first outlet valve valve seat pocket of the plurality of valve seat pockets which is provided for the first gas exchange outlet valve is greater than a maximum depth of a second outlet valve valve seat pocket of the plurality of valve seat pockets which is provided for the second gas exchange outlet valve. In this way, the less deep second outlet valve valve seat pocket can have a positive influence on the degree of high pressure efficiency.

In one development, the maximum depth of the first outlet valve valve seat pocket lies in a range of up to 4 mm. As an alternative or in addition, the maximum depth of the second outlet valve valve seat pocket lies in a range of up to 2 mm.

In a further design variant, a maximum depth of a first inlet valve valve seat pocket of the plurality of valve seat pockets which is provided for the first gas exchange inlet valve is greater than or equal to a maximum depth of a second inlet valve valve seat pocket of the plurality of valve seat pockets which is provided for the second gas exchange inlet valve. In this way, depending on the requirement, the less deep second inlet valve valve seat pocket can have a positive influence on the degree of high pressure efficiency. As an alternative, two less deep inlet valve valve seat pockets can be provided, in order to have a positive influence on the degree of high pressure efficiency.

In one development, the maximum depth of the first inlet valve valve seat pocket lies in a range between greater than 0 mm and 2 mm. As an alternative or in addition, the maximum depth of the second inlet valve valve seat pocket lies in a range between greater than 0 mm and 2 mm.

In a further exemplary embodiment, a depth of the plurality of valve seat pockets is adapted in each case to a valve lift of the respective gas exchange inlet valve and gas exchange outlet valve at the top dead centre of a piston movement of the piston.

It is possible that some or a plurality of the valve seat pockets are connected to one another and/or merge into one another.

The valve seat pockets preferably lie opposite the respective gas exchange valves. For example, a first outlet valve valve seat pocket can lie opposite the first gas exchange outlet valve, and a first inlet valve valve seat pocket can lie opposite the first gas exchange inlet valve.

For example, the first gas exchange inlet valve and the second gas exchange inlet valve are configured for feeding air or an air/fuel mixture into a combustion chamber of the cylinder, and/or the first gas exchange outlet valve and the second gas exchange outlet valve are configured for discharging the exhaust gas from a combustion chamber of the cylinder into an exhaust gas section. In particular, the piston crown can delimit a combustion chamber of the cylinder.

The invention also relates to a motor vehicle, in particular a commercial vehicle (for example, a lorry or an omnibus), having an internal combustion engine as disclosed herein.

It is also possible, however, to use the apparatus as disclosed herein for passenger motor vehicles, large engines, all-terrain vehicles, stationary engines, marine engines, etc.

BRIEF DESCRIPTION OF THE DRAWINGS

The above-described preferred embodiments and features of the invention can be combined with one another in any desired manner. Further details and advantages of the invention will be described in the following text with reference to the appended drawings, in which.

DETAILED DESCRIPTION

Figure 1:
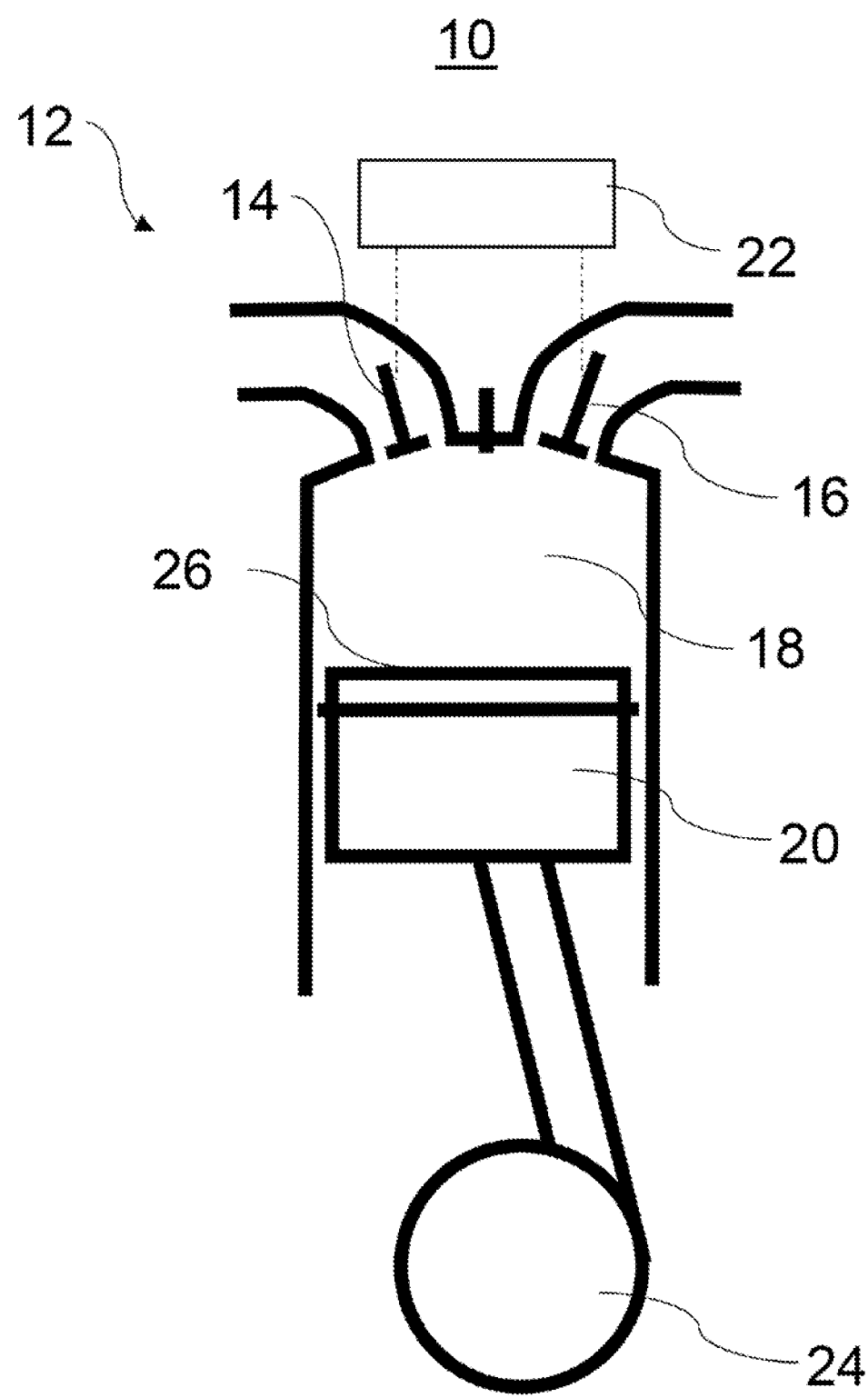
FIG. 1 shows a diagrammatic view of a cylinder of an internal combustion engine.

The embodiments which are shown in the figures match one another at least partially, with the result that similar or identical parts are provided with the same reference numerals and reference is also made to the description of the other embodiments and/or figures in order to describe them, so as to avoid repetitions.

FIG. 1 shows a cylinder 12 of an internal combustion engine 10. The internal combustion engine 10 is a four stroke internal combustion engine, in particular a four stroke diesel internal combustion engine or a four stroke petrol internal combustion engine. The internal combustion engine 10 is preferably included in a commercial vehicle, for example a lorry or an omnibus, for driving the commercial vehicle.

The cylinder 12 has a plurality of gas exchange inlet valves 14 (only one shown in FIG. 1), a plurality of gas exchange outlet valves 16 (only one shown in FIG. 1), a combustion chamber 18 and a piston 20.

The gas exchange inlet valves 14 connect the combustion chamber 18 to an air feed system of the internal combustion engine 10 for feeding combustion air or an air/fuel mixture into the combustion chamber 18. The gas exchange outlet valves 16 connect the combustion chamber 18 to an exhaust gas section of the internal combustion engine 10 for discharging exhaust gases. For example, two gas exchange inlet valves 14 and two gas exchange outlet valves 16 per cylinder 12 and a plurality of cylinders 12 can be provided.

The gas exchange inlet valves 14 and the gas exchange outlet valves 16 can be capable of being actuated in each case individually and in each case independently of one another. For example, a dedicated rocker arm or drag lever of a variable valve train 22 can be provided for each gas exchange inlet valve 14 and each gas exchange outlet valve 16. The variable valve train 22 can be configured, for example, as a sliding cam system. The sliding cam system can have a plurality of cam carriers with a plurality of cams. The cam carrier can be arranged on a camshaft fixedly so as to rotate with it and in an axially displaceable manner. The gas exchange inlet valves 14 and the gas exchange outlet valves 16 are actuated by different cams of the cam carrier in a manner which is dependent on an axial position of the cam carrier. It is also possible, for example, that the gas exchange inlet valves 14 cannot be actuated individually and independently of one another.

The piston 20 is arranged in the cylinder 12 such that it can be moved to and fro in a known way, and is connected to a crankshaft 24. The piston 20 has a piston crown 26 which is directed towards the combustion chamber 18.

Figure 2:
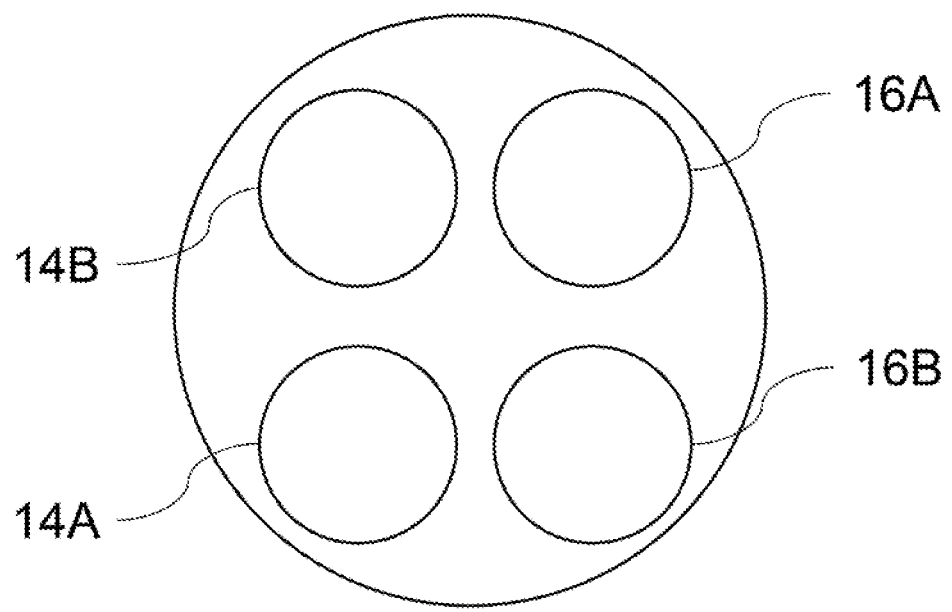
FIG. 2 shows a view from below of four gas exchange valves of a cylinder of an internal combustion engine.

FIG. 2 shows a view from below of a section of a cylinder head which covers the combustion chamber 18 (see FIG. 1). It can be seen that four gas exchange valves are provided as poppet valves. In detail, a first gas exchange inlet valve 14A, a second gas exchange inlet valve 14B, a first gas exchange outlet valve 16A and a second gas exchange outlet valve 16B are provided.

Figure 3:
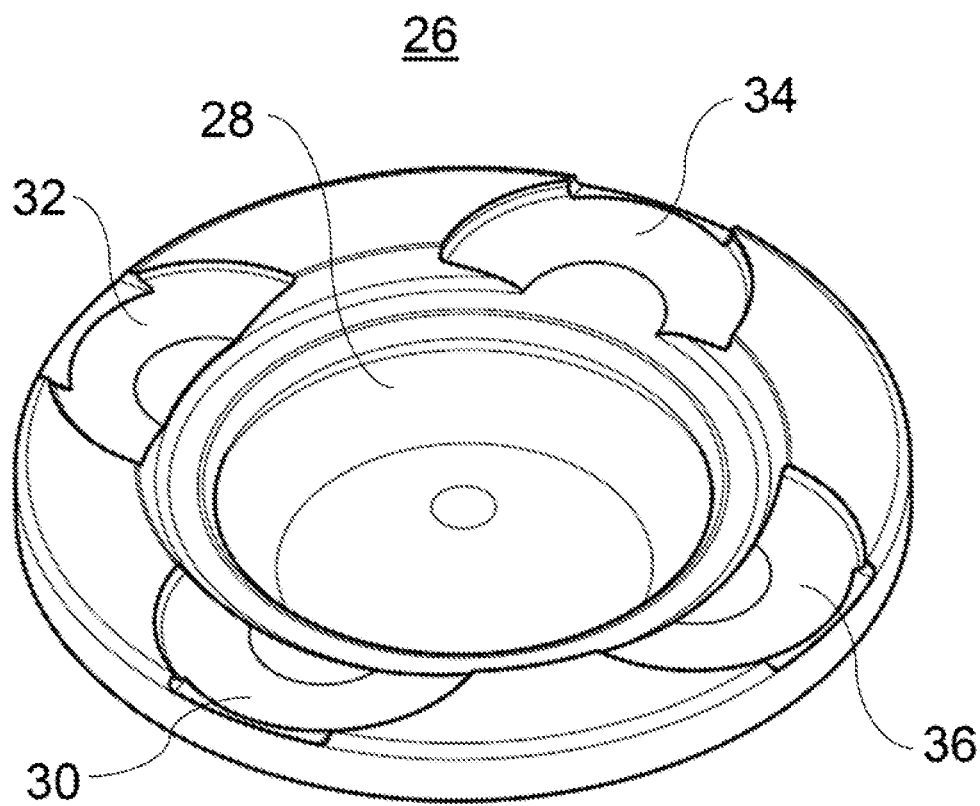
FIG. 3 shows a perspective view of a piston crown with four valve seat pockets in accordance with the present disclosure.

FIG. 3 shows a perspective view of the piston crown 26. The piston crown 26 has a combustion-optimized piston crown recess 28 and four valve seat pockets 30, 32, 34 and 36. In detail, a first inlet valve valve seat pocket 30 is provided for the first gas exchange inlet valve 14A (see FIG. 2). A second inlet valve valve seat pocket 32 is provided for the second gas exchange inlet valve 14B (see FIG. 2). A first outlet valve valve seat pocket 34 is provided for the first gas exchange outlet valve 16A (see FIG. 2). A second outlet valve valve seat pocket 36 is provided for the second gas exchange outlet valve 16B (see FIG. 2).

The present disclosure is based on the finding that the provision of valve seat pockets in the piston crown can impair the degree of high pressure efficiency, inter alia by way of the change of the combustion-optimized piston crown recess 28. It is therefore proposed to reduce the influence of the valve seat pockets on the degree of high pressure efficiency, without dispensing with the valve overlap which is made possible by way of the valve seat pockets for flushing the cylinder. It is proposed in detail to dispense with from one to two of the valve seat pockets or to configure them/it to be less deep, without experiencing disadvantages in the gas exchange. For example, an efficiency of the combustion can be increased by way of the omission of from one to two valve seat pockets and/or a reduction in a maximum depth of from one to two valve seat pockets, by virtue of the fact that the combustion-optimized shape of the piston crown recess 28 is impaired to a lesser extent.

For example, the valve seat pockets 30, 32, 34 and 36 can have different maximum depths. For example, the first inlet valve valve seat pocket 30 and the first outlet valve valve seat pocket 34 can be provided with a greater maximum depth than the second inlet valve valve seat pocket 32 and a second outlet valve valve seat pocket 36. For example, the first outlet valve valve seat pocket 34 can have a maximum depth in a range between 2 mm and 4 mm. The second outlet valve valve seat pocket 34, the first inlet valve valve seat pocket 30 and the second inlet valve valve seat pocket can have a depth, for example, in a range between 0 mm and 2 mm.

The depths of the valve seat pockets 30-36 influence the extent to which a gas exchange valve can be opened at the top dead centre of a piston movement of the piston. The deeper a valve seat pocket, the further a gas exchange valve can be opened at the top dead centre without coming into contact with the piston crown. The deeper valve seat pockets 30, 34 make a greater valve overlap possible between the first gas exchange inlet valve 14A and the first gas exchange outlet valve 16A.

Figure 4:
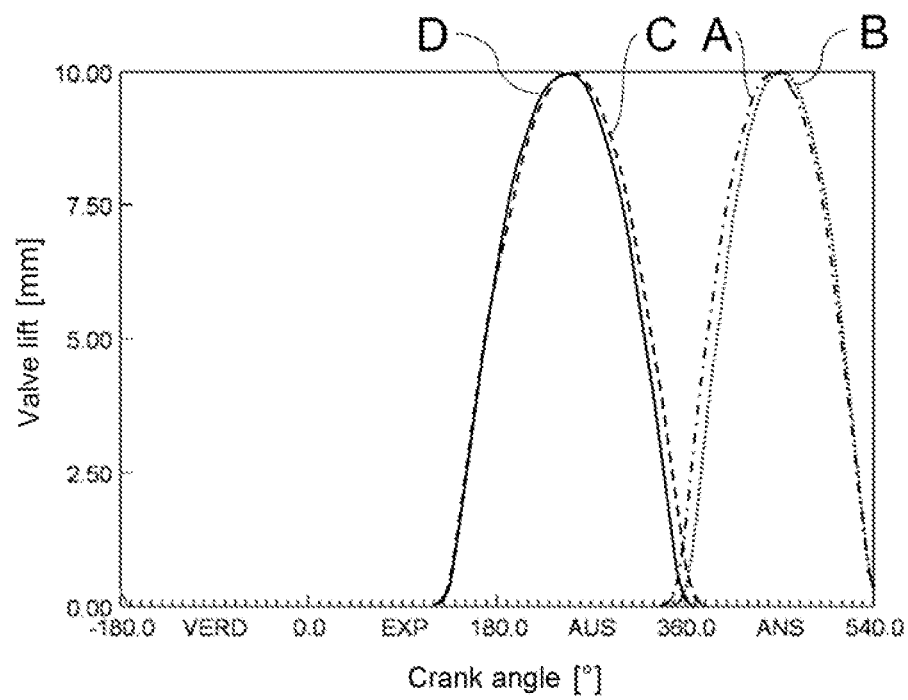
FIG. 4 shows a valve control diagram for two gas exchange inlet valves and two gas exchange outlet valves in accordance with the present disclosure.

FIG. 4 shows a valve control diagram by way of example. The valve control diagram shows the valve lifts of the gas exchange valves 14A, 14B, 16A, 16B. A dash-dotted curve A shows the valve lift for the first gas exchange inlet valve 14A. A dotted curve B shows the valve lift for the second gas exchange inlet valve 14B. A dashed curve C shows the valve lift for the first gas exchange outlet valve 16A. A continuous curve D shows the valve lift for the second gas exchange outlet valve 16B.

It can be seen that the first gas exchange outlet valve 16A (curve C) closes later than the second gas exchange outlet valve 16B (curve D). In addition, the first gas exchange inlet valve 14A (curve A) opens earlier than the second gas exchange inlet valve 14B (curve B). In this way, there is a great valve overlap in the range of approximately 40° CA (crank angle) between the first gas exchange outlet valve 16A (curve C) and the first gas exchange inlet valve 14A (curve A). There is a small valve overlap in the range of approximately 20° CA between the second gas exchange outlet valve 16B (curve D) and the second gas exchange inlet valve 14B (curve B).

It has been ascertained that, in the case of a great valve overlap between a gas exchange inlet valve and a gas exchange outlet valve, a flushing operation can be achieved which corresponds approximately to a flushing operation of the combustion chamber which is achieved in the case of a great valve overlap between two gas exchange inlet valves and two gas exchange outlet valves. This relationship is shown in FIG. 5.

Figure 5:
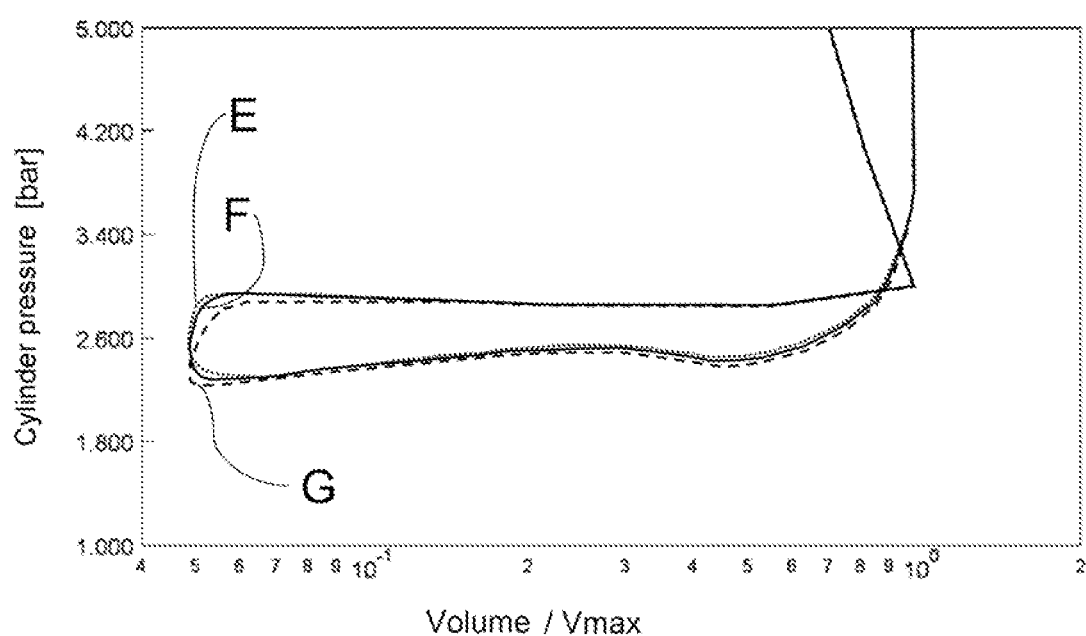
FIG. 5 shows a cylinder pressure diagram for different valve overlaps of the gas exchange valves.

FIG. 5 shows the cylinder pressure gradient in a manner which is dependent on a volume of the combustion chamber for three different configurations. A curve E shows the cylinder pressure gradient in the case of two gas exchange inlet valves and two gas exchange outlet valves which are all actuated with a valve overlap of 40° CA. A curve F shows the cylinder pressure gradient in the case of a valve actuation in accordance with FIG. 4 (one gas exchange inlet valve and one gas exchange outlet valve have a valve overlap of 40° CA, and a further gas exchange inlet valve and a further gas exchange outlet valve have a valve overlap of 20° CA). A curve G shows the cylinder pressure gradient in the case of two gas exchange inlet valves and two gas exchange outlet valves which are all actuated with a valve overlap of 20° CA.

It can be seen that the curves E and F differ from one another merely insignificantly, whereas the curve G shows more pronounced deviations from the curves E and F. The similar cylinder pressure gradients of the curves E and F are an indicator that the flushing operation during the valve overlap is similarly pronounced in the case of the curves E and F. In this way, approximately the same effects with regard to the flushing operation and the gas exchange can be achieved by way of a valve actuation in accordance with FIG. 4 as in the case of conventional techniques, in the case of which all four gas exchange valves are actuated with a great valve overlap. As a consequence, it can be sufficient for the flushing operation of the combustion chamber during the valve overlap if merely one gas exchange inlet valve and one gas exchange outlet valve are open at the same time. This applies, in particular, at low rotational speeds, in the case of which there is a longer duration time. The valve lift curves of the other gas exchange valves can be designed without an overlap or with only a small overlap. In the extreme case, no valve seat pockets at all are therefore required for the other gas exchange valves.

In the case of the application of modern compression release engine brakes, in the case of which a gas exchange outlet valve is opened, for example, at the end of the compression stroke in a deviation from a normal actuation, as disclosed, for example, in DE 10 2013 019 183 A1, an outlet valve valve seat pocket is necessary as a matter of principle. The said valve seat pockets and the associated gas exchange outlet valve can therefore be used for the valve overlap, without it being necessary for additional dead space to be generated. On the inlet side, the best compromise has to be found between one deeper valve seat pocket or two less deep valve seat pockets, in order to achieve the aims of the valve overlap.

In this way, the concepts of the present disclosure can be used in the case of different piston crowns and different valve actuation means.

Figure 6:
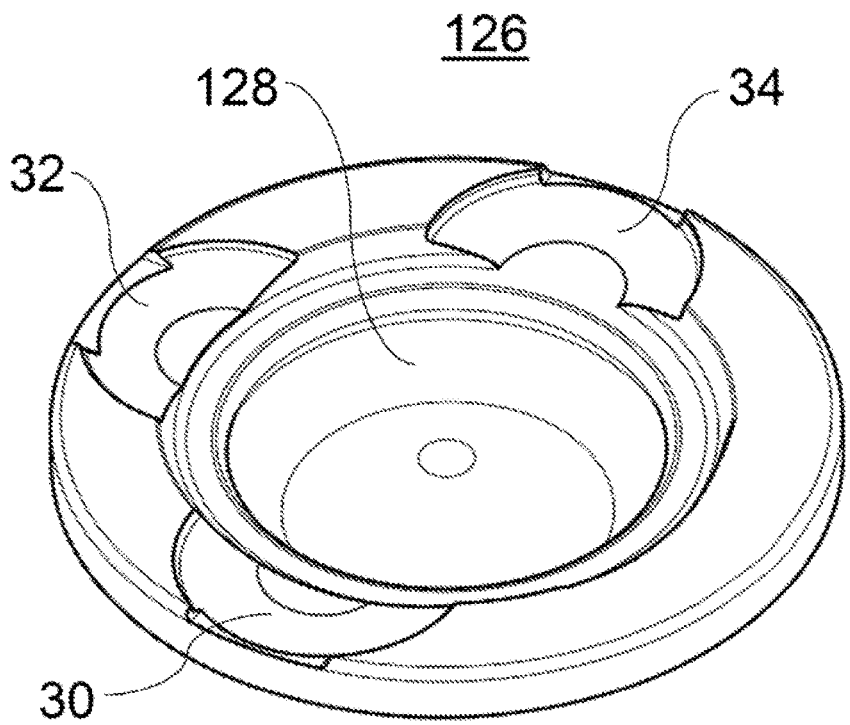
FIG. 6 shows a piston crown with three valve seat pockets in accordance with the present disclosure.

FIG. 6 shows an exemplary embodiment, in the case of which a piston crown 126 has only three valve seat pockets 30, 32, 34 and a combustion-optimized piston crown recess 128. In detail, a first inlet valve valve seat pocket 30 is provided for the first gas exchange inlet valve 14A (see FIG. 2). A second inlet valve valve seat pocket 32 is provided for the second gas exchange inlet valve 14B (see FIG. 2). A first outlet valve valve seat pocket 34 is provided for the first gas exchange outlet valve 16A (see FIG. 2). No valve seat pocket is provided for the second gas exchange outlet valve 16B (see FIG. 2). The first inlet valve valve seat pocket 30 and the second inlet valve valve seat pocket 32 can be, for example, of identical depth or of different depths.

In this way, for example, a great valve overlap can be realized between the first and/or second gas exchange inlet valve 14A, 14B on one side and the first gas exchange outlet valve 16A on the other side. The second gas exchange outlet valve 16B can close exactly at the end of or briefly after the end of the exhaust stroke.

Figure 7:
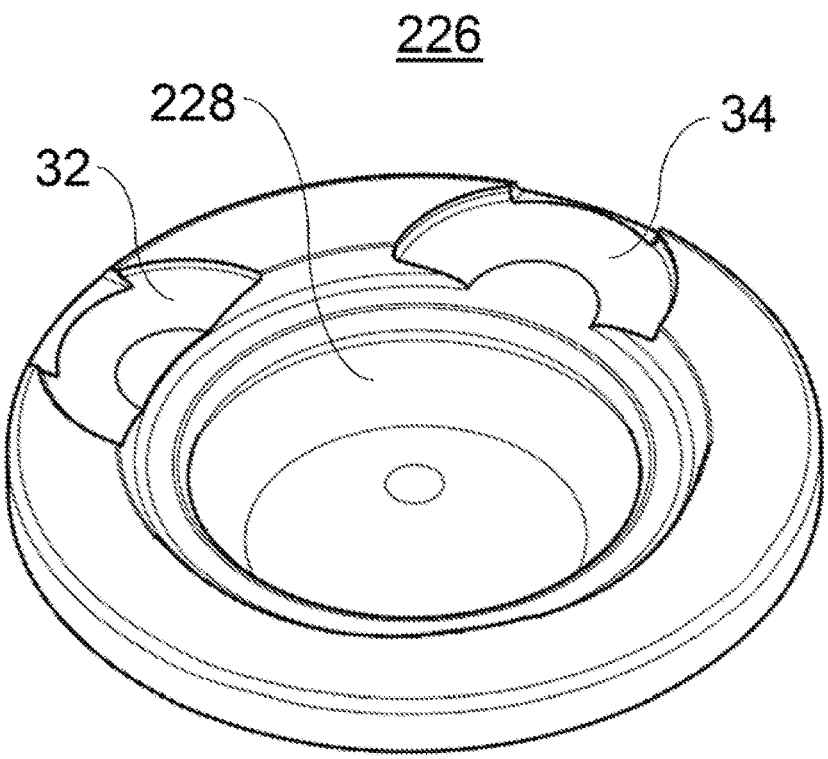
FIG. 7 shows a piston crown with two valve seat pockets in accordance with the present disclosure.

FIG. 7 shows an exemplary embodiment, in the case of which a piston crown 226 has only two valve seat pockets 32, 34 and a combustion-optimized piston crown recess 228. The valve seat pocket 32 is assigned to a gas exchange inlet valve, and the valve seat pocket 34 is assigned to a gas exchange outlet valve. In contrast, the respective other gas exchange inlet valve and gas exchange outlet valve does not have a valve seat pocket.

In this way, for example, a great valve overlap can be realized between a gas exchange inlet valve and a gas exchange outlet valve. No valve overlap or a merely very small valve overlap takes place between the respective other gas exchange inlet valve and gas exchange outlet valve.

Figure 8:
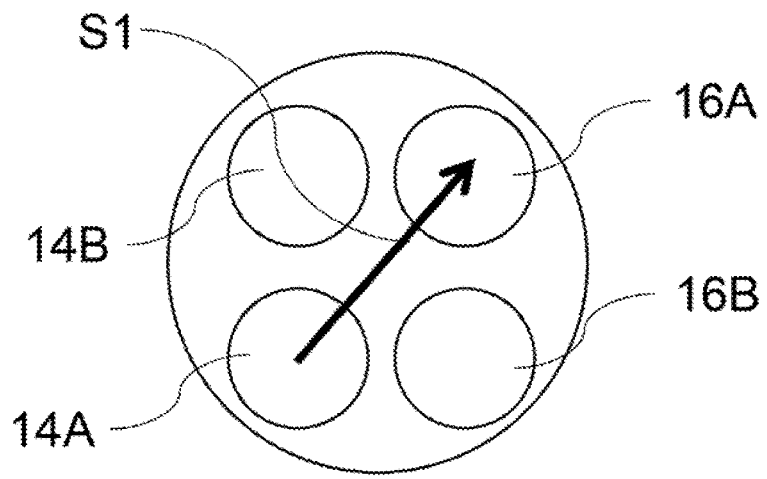
FIG. 8 shows a view from below of four gas exchange valves of a cylinder of an internal combustion engine and an exemplary flushing operation in the case of the gas exchange in accordance with the present disclosure.
Figure 9:
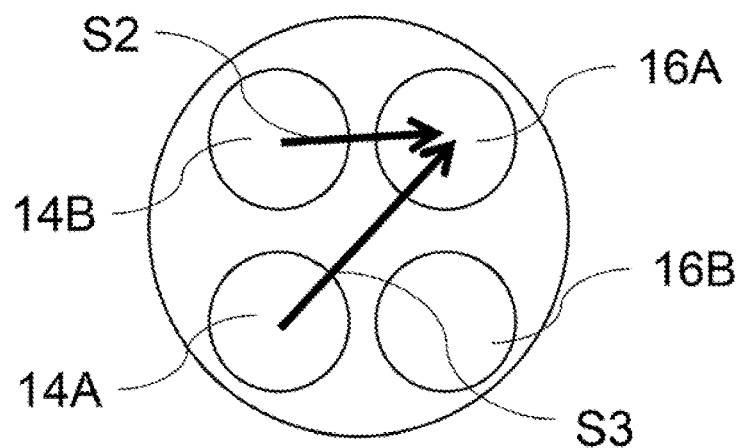
FIG. 9 shows a view from below of four gas exchange valves of a cylinder of an internal combustion engine and a further exemplary flushing operation in the case of the gas exchange in accordance with the present disclosure.
Figure 10:
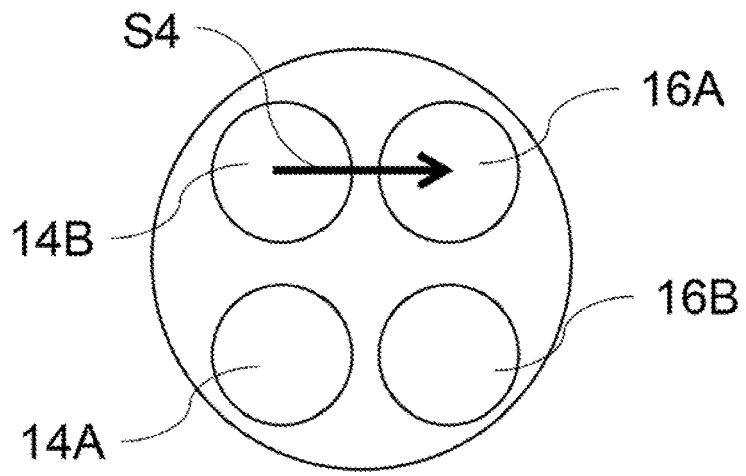
FIG. 10 shows a view from below of four gas exchange valves of a cylinder of an internal combustion engine and a further different exemplary flushing operation in the case of the gas exchange in accordance with the present disclosure.

FIGS. 8 to 10 show different examples as to how the flushing operation at the transition between the exhaust stroke and the intake stroke can be realized in accordance with the present disclosure. The flushing operation takes place substantially between those gas exchange valves which have a great valve overlap with one another.

In accordance with FIG. 8, for example, a flushing operation (arrow S1) can take place substantially between a gas exchange inlet valve 14A and a gas exchange outlet valve 16A which lie obliquely opposite one another. As a result, a flushing operation which is as satisfactory as possible and/or residual gas reduction and cooling of the combustion chamber can be achieved. There is a great valve overlap between the gas exchange valves 14A and 16A. There is a small valve overlap or no valve overlap at all between the gas exchange valves 14B and 16B.

In accordance with FIG. 9, a flushing operation (arrows S2 and S3) can take place substantially between two gas exchange inlet valves 14A, 14B and a gas exchange outlet valve 16A. There is a great valve overlap between the gas exchange valves 14A, 14B and 16A. As a result, both a satisfactory flushing operation and residual gas reduction, and also a mass flow which is as great as possible can be achieved.

In accordance with FIG. 10, for example, a flushing operation (arrow S4) can take place substantially between a gas exchange inlet valve 14B and a gas exchange outlet valve 16A which lie directly opposite one another. As a result, a mass flow which is as great as possible can be achieved during the valve overlap. There is a great valve overlap between the gas exchange valves 14B and 16A. There is a small valve overlap or no valve overlap at all between the gas exchange valves 14A and 16B.

The invention is not restricted to the above-described preferred exemplary embodiments. Rather, a multiplicity of variants and modifications are possible which likewise utilize the concept of the invention and therefore fall within the scope of protection. In particular, the invention also claims protection for the subject matter and the features of the subclaims independently of the claims, to which reference is made. In particular, the features of independent Claim 1 are disclosed independently of one another. In addition, the features of the subclaims are also disclosed independently of all the features of independent Claim 1 and, for example, independently of the features with regard to the presence and the configuration of the cylinder, the first gas exchange outlet valve, the second gas exchange outlet valve, the first gas exchange inlet valve, the second gas exchange inlet valve, the piston, the piston crown and the plurality of valve seat pockets of independent Claim 1.

LIST OF REFERENCE NUMERALS

10 Internal combustion engine
12 Cylinder
14 Gas exchange inlet valve
14A First gas exchange inlet valve
14B Second gas exchange inlet valve
16 Gas exchange outlet valve
16A First gas exchange outlet valve
16B Second gas exchange outlet valve
18 Combustion chamber
20 Piston
22 Variable valve train
24 Crankshaft
26 Piston crown
28 Piston crown recess
30 First inlet valve valve seat pocket
32 Second inlet valve valve seat pocket
34 First outlet valve valve seat pocket
36 Second outlet valve valve seat pocket
126 Piston crown
128 Piston crown recess
226 Piston crown
228 Piston crown recess
A-D Valve control curves
E-G Cylinder pressure gradients
S1-S4 Flushing direction

The invention claimed is:

1. An internal combustion engine for a motor vehicle, having at least one cylinder comprising:
   a first gas exchange inlet valve and a second gas exchange inlet valve;
   a first gas exchange outlet valve and a second gas exchange outlet valve; and
   a piston configured to be moved to and fro and including piston crown having a plurality of valve seat pockets:
   wherein,
      in each case at least one valve seat pocket being provided for the first gas exchange inlet valve, the second gas exchange inlet valve, the first gas exchange outlet valve and the second gas exchange outlet valve, and the plurality of valve seat pockets having at least partially different depths, wherein
      the first gas exchange outlet valve is closing or configured to be closing later than the second gas exchange outlet valve and/or the first gas exchange inlet valve is opening or configured to be opening earlier than the second gas exchange inlet valve; and
      a valve overlap between the first gas exchange outlet valve and the first gas exchange inlet valve is configured to be lying in a range between 30° CA and 50° CA; and
      a valve overlap between the second gas exchange outlet valve and the second gas exchange inlet valve is configured to be lying in a range between 0° CA and 30° CA.

2. The internal combustion engine according to claim 1, wherein the first gas exchange outlet valve and the first gas exchange inlet valve is actuated or configured to be actuated with a valve overlap.

3. The internal combustion engine according to claim 1, wherein the first gas exchange outlet valve and the first gas exchange inlet valve is actuated or configured to be actuated with a valve overlap which is greater than a valve overlap between the second gas exchange outlet valve and the second gas exchange inlet valve; or
   wherein the first gas exchange outlet valve and the first gas exchange inlet valve is actuated or configured to be actuated with a valve overlap, and the second gas exchange outlet valve and the second gas exchange inlet valve is actuated or configured to be actuated without a valve overlap.

4. The internal combustion engine according to claim 2, wherein a flushing operation of the cylinder during the valve overlap occurs:
   substantially between the first gas exchange inlet valve and the first gas exchange outlet valve which lie directly or obliquely opposite one another; or substantially between the first gas exchange inlet valve, the second gas exchange inlet valve and the first gas exchange outlet valve.

5. The internal combustion engine according to claim 1, wherein the first gas exchange outlet valve and the second gas exchange outlet valve is actuated or configured to be actuated independently of one another; and/or
wherein the first gas exchange inlet valve and the second gas exchange inlet valve is actuated or configured to be actuated independently of one another.

6. The internal combustion engine according to claim 1, wherein a valve lift of the first gas exchange outlet valve at a top dead centre of a piston movement of the piston being greater than a valve lift of the second gas exchange outlet valve at the top dead centre; and/or
wherein a valve lift of the first gas exchange inlet valve at a top dead centre of a piston movement of the piston being greater than or equal to a valve lift of the second gas exchange inlet valve at the top dead centre.

7. The internal combustion engine according to claim 1, wherein the piston crown comprises a piston crown recess.

8. The internal combustion engine according to claim 1, wherein a maximum depth of a first outlet valve valve seat pocket of the plurality of valve seat pockets which is provided for the first gas exchange outlet valve being greater than a maximum depth of a second outlet valve valve seat pocket of the plurality of valve seat pockets which is provided for the second gas exchange outlet valve.

9. The internal combustion engine according to claim 8, wherein the maximum depth of the first outlet valve valve seat pocket lying in a range of up to 4 mm, and the maximum depth of the second outlet valve valve seat pocket lying in a range of up to 2 mm.

10. The internal combustion engine according to claim 1, wherein a maximum depth of a first inlet valve valve seat pocket of the plurality of valve seat pockets which is provided for the first gas exchange inlet valve being greater than or equal to a maximum depth of a second inlet valve valve seat pocket of the plurality of valve seat pockets which is provided for the second gas exchange inlet valve.

11. The internal combustion engine according to claim 10, wherein the maximum depth of the first inlet valve valve seat pocket lying in a range between greater than O mm and 2 mm; and
wherein the maximum depth of the second inlet valve valve seat pocket lying in a range between greater than O mm and 2 mm.

12. The internal combustion engine according to claim 1, wherein a depth of the plurality of valve seat pockets being adapted in each case to a valve lift of the respective gas exchange inlet valve and gas exchange outlet valve at a top dead centre of a piston movement of the piston.

13. A motor vehicle, having an internal combustion engine according to claim 1.

14. The internal combustion engine according to claim 1, wherein a valve overlap between the first gas exchange outlet valve and the first gas exchange inlet valve is configured to be lying at approximately 40° CA; and/or
wherein a valve overlap between the second gas exchange outlet valve and the second gas exchange inlet valve is configured to be lying at approximately 20° CA.

* * * * *